(12) United States Patent
Jordan

(10) Patent No.: US 12,024,238 B2
(45) Date of Patent: Jul. 2, 2024

(54) ROTATION-LIMITING ASSEMBLY AND STEERING WHEEL ASSEMBLY FOR A STEER-BY-WIRE STEERING SYSTEM

(71) Applicant: ZF Automotive Germany GmbH, Alfdorf (DE)

(72) Inventor: Martin Jordan, Düsseldorf (DE)

(73) Assignee: ZF Automotive Germany GmbH, Alfdorf (DE)

( * ) Notice: Subject to any disclaimer, the term of this patent is extended or adjusted under 35 U.S.C. 154(b) by 0 days.

(21) Appl. No.: 17/978,763

(22) Filed: Nov. 1, 2022

(65) Prior Publication Data
US 2023/0135320 A1 May 4, 2023

(30) Foreign Application Priority Data
Nov. 2, 2021 (DE) .......................... 102021212302.3

(51) Int. Cl.
*B62D 5/00* (2006.01)
*B62D 1/16* (2006.01)

(52) U.S. Cl.
CPC ............... *B62D 5/001* (2013.01); *B62D 1/16* (2013.01)

(58) Field of Classification Search
CPC .................................. B62D 1/16; B62D 5/001
See application file for complete search history.

(56) References Cited

U.S. PATENT DOCUMENTS

| | | | | |
|---|---|---|---|---|
| 6,290,396 | B1 * | 9/2001 | Forbes-Robinson | F16C 33/04 384/276 |
| 10,844,909 | B2 * | 11/2020 | Pattok | B62D 5/0415 |
| 11,383,755 | B2 * | 7/2022 | Molinar | B62D 1/20 |
| 11,773,911 | B2 * | 10/2023 | Pattok | B62D 5/0415 180/443 |
| 11,801,883 | B2 * | 10/2023 | Büker | B62D 1/185 |
| 2017/0043746 | A1 | 2/2017 | Caverly | |
| 2019/0128332 | A1 * | 5/2019 | Pattok | H02K 15/03 |
| 2020/0325990 | A1 * | 10/2020 | Wilson-Jones | B62D 5/006 |
| 2021/0025458 | A1 * | 1/2021 | Pattok | F16D 3/06 |
| 2021/0332890 | A1 * | 10/2021 | Wilson-Jones | B62D 1/20 |
| 2022/0177023 | A1 * | 6/2022 | Büker | F16C 3/03 |
| 2022/0185360 | A1 * | 6/2022 | Molinar | F16C 29/02 |

(Continued)

FOREIGN PATENT DOCUMENTS

| | | | | |
|---|---|---|---|---|
| DE | 102011108688 A1 * | 1/2013 | | B62D 1/16 |
| DE | 102016216011 A1 * | 3/2018 | | B62D 1/16 |
| DE | 102018126714 A1 | 4/2020 | | |

*Primary Examiner* — Amy R Weisberg
*Assistant Examiner* — Maxwell L Meshaka
(74) *Attorney, Agent, or Firm* — Kristin L. Murphy

(57) ABSTRACT

A rotation-limiting assembly for a steer-by-wire steering system is described. The rotation-limiting assembly comprises a housing, in which a shaft portion rotatable about a center axis is accommodated, wherein the shaft portion is coupled to the housing via a threaded pair, a sliding guide, and a force fit or a further sliding guide. The force fit couples the shaft portion to the housing in such a manner that, when a predefined breakaway torque is exceeded, the shaft portion is rotatable in relation to the housing. Furthermore, a first stop disk is provided on a first axial side of a sliding guide external contour of the sliding guide and a second stop disk is provided on a second axial side. Moreover, a steering wheel assembly for a steer-by-wire steering system, having such a rotation-limiting assembly is presented.

20 Claims, 6 Drawing Sheets

(56) References Cited

U.S. PATENT DOCUMENTS

| | | | | |
|---|---|---|---|---|
| 2022/0402541 | A1* | 12/2022 | Yeom | B62D 5/001 |
| 2023/0015798 | A1* | 1/2023 | Kim | B62D 6/008 |
| 2023/0109811 | A1* | 4/2023 | Jordan | B62D 5/005 |
| | | | | 701/41 |
| 2023/0132966 | A1* | 5/2023 | Jordan | B62D 5/001 |
| | | | | 74/527 |
| 2023/0135320 | A1* | 5/2023 | Jordan | B62D 5/001 |
| | | | | 74/495 |
| 2023/0174150 | A1* | 6/2023 | Kim | B62D 5/006 |
| | | | | 701/41 |
| 2023/0235778 | A1* | 7/2023 | Song | F16C 3/03 |
| | | | | 464/183 |

* cited by examiner

ROTATION-LIMITING ASSEMBLY AND STEERING WHEEL ASSEMBLY FOR A STEER-BY-WIRE STEERING SYSTEM

CROSS-REFERENCE TO RELATED APPLICATION

This application claims priority to German Priority Application No. 102021212302.3, filed Nov. 2, 2021, the disclosure of which is incorporated herein by reference in its entirety.

TECHNICAL FIELD

The disclosure relates to a rotation-limiting assembly for a steer-by-wire steering system, having a housing, in which a shaft portion rotatable about a center axis, is accommodated and can be coupled rotationally to a steering wheel shaft or is designed as a portion of the steering wheel shaft.

BACKGROUND

Rotation-limiting assemblies are customarily configured in such a manner that, when the maximally permitted angle of rotation is reached, the shaft portion runs against a comparatively hard stop and can no longer be further rotated. This striking action may surprise a driver of the vehicle provided with the rotation-limiting assembly and may therefore be perceived to be uncomfortable. The driver does not have any possibility of getting ready for imminently reaching the maximally permitted angle of rotation.

SUMMARY

The disclosure describes a rotation-limiting assembly, in which the shaft portion is coupled to the housing via a threaded pair, comprises an external thread and an internal thread screwed into the external thread, a sliding guide with a sliding guide external contour and a sliding guide internal contour, and a force fit. Instead of the force fit, a further sliding guide may also be provided. The threaded pair, the sliding guide, and the force fit or the further sliding guide are arranged sequentially in the radial direction. If a force fit is provided, the latter couples the shaft portion to the housing in such a manner that, when a predefined breakaway torque is exceeded, the shaft portion is rotatable in relation to the housing. In addition, a first stop disk is provided on the shaft portion on a first axial side of the sliding guide external contour and a second stop disk is provided on the shaft portion on a second axial side which is opposed to the first axial side. The first stop disk and the second stop disk are designed to make contact with a component carrying the sliding guide internal contour, in order to limit a rotational movement of the shaft portion. In this connection, the sequential arrangement of the threaded pair, the sliding guide, and the force fit or the further sliding guide does not imply any order whatsoever. The threaded pair, the sliding guide, and the force fit or the further sliding guide can therefore be arranged in any order along a radial direction of flow of force or torque.

The threaded pair serves to convert a rotational movement of the shaft portion into a translational movement. The translational movement takes place along the center axis, i.e. axially. The sliding guide serves to support the torque introduced by rotation of the shaft portion and to ensure movability in the axial direction. Depending on the direction of rotation, after overcoming a predetermined axial distance which corresponds to a maximally permissible angle of rotation of the shaft portion, the component carrying the sliding guide internal contour therefore makes contact with the first stop disk or the second stop disk. Rotation of the shaft portion is thereby reliably limited. If the shaft portion is coupled to the housing via the force fit, even in the event of making contact with the respective stop disk the shaft portion can be rotated further in relation to the housing if the breakaway torque is exceeded. If the shaft portion is coupled to the housing via the further sliding guide, a further displacement relative to the housing can take place. From the view of a user of the rotation-limiting assembly, rotation of the steering wheel is therefore not limited by a hard stop. On the contrary, after contact is made with the first stop disk or the second stop disk, the user feels a significantly increased resistance on operating the steering wheel. This may cause the user not to rotate the steering wheel further. Overall, a high degree of comfort for the operation of the rotation-limiting assembly is produced. The rotation-limiting assembly comprises few components and is therefore constructed structurally simply and compactly. Owing to the fact that sliding guides, force fits, and threaded pairs can easily be produced by conventional methods and systems, the rotation-limiting assembly can also be produced cost-effectively.

The sliding guide comprises, for example, a toothing running solely in the axial direction. It is also possible to realize the sliding guide by flattened portions provided on the shaft portion.

In another exemplary arrangement, the sliding guide external contour is provided on the external circumference of a first sliding guide sleeve that is fastened on the shaft portion via the force fit such that, when a predefined breakaway torque is exceeded, the first sliding guide sleeve is rotatable in relation to the shaft portion.

The component carrying the sliding guide internal contour can likewise be a sleeve-shaped component, on the internal circumference of which the sliding guide internal contour is provided. This component can be referred to as a second sliding guide sleeve.

In a further exemplary arrangement, an internally threaded sleeve is provided which, on its internal circumference, has an internal thread that cooperates with an external thread provided on the component carrying the sliding guide internal contour, wherein the internally threaded sleeve is fastened to the housing via the force fit such that, when a predefined breakaway torque is exceeded, the internally threaded sleeve is rotatable in relation to the housing. In another example, the internally threaded sleeve is coupled non-rotatably, but axially displaceably, to the housing via the further sliding guide. Furthermore, the internally threaded sleeve has a compact design, and therefore the rotation-limiting assembly can be installed as a whole in a small construction space. Compared to the previously mentioned arrangement, there is moreover the advantage that a torque that has to be introduced into the threaded pair from the shaft portion does not pass via the force fit in a situation in which the predefined breakaway torque is not exceeded.

The first sliding guide sleeve can be fastened to the shaft portion via a force-fitting ring arranged radially between the first sliding guide sleeve and the shaft portion. In another example, the internally threaded sleeve can be fastened to the housing via a force-fitting ring arranged radially between the internally threaded sleeve and the housing. A force-fitting ring here is an annular component that can be arranged in an annular gap between two components to be coupled to each other. The force-fitting ring couples these two components in a force-fitting or frictionally locking manner. Furthermore, the force-fitting ring has the property that it acts with respectively predefined friction forces on the components to be coupled. A breakaway torque can therefore be set precisely.

The force-fitting ring is formed as a punched and bent part. The force-fitting ring can be produced from sheet metal. As a rule, they have a multiplicity of tabs or convexities which can each be applied under a predefined stress to the associated components. A breakaway torque can thereby be set with a comparatively high degree of accuracy.

According to one exemplary arrangement, at least one holding disk that is spring-loaded in the axial direction lies under prestress in the axial direction on the first sliding guide sleeve such that the first sliding guide sleeve is fastened to the shaft portion by the holding disk via the force fit. In another example, the at least one holding disk that is spring-loaded in the axial direction lies under prestress in the axial direction on the internally threaded sleeve such that the internally threaded sleeve is fastened to the housing by the holding disk via the force fit. In the first case, the holding disk can be coupled non-rotatably but axially displaceably to the shaft portion. In the second case, the holding disk can be coupled non-rotatably, but axially displaceably to the housing. An associated breakaway torque can be set in a simple manner by a corresponding prestress in the axial direction being selected. In order to produce the prestress, use can be made, for example, of a spring device. Overall, a simple design of the rotation-limiting assembly is produced.

Such a holding disk may be, but does not have to be, used in combination with a force-fitting ring. It is therefore conceivable for the force fit within the rotation-limiting assembly to be realized by a holding disk. It is likewise possible, as already explained, for the force fit to be brought about by a force-fitting ring, i.e. without a holding disk. Furthermore, it is conceivable to use both a force-fitting ring and a holding disk for generating the force fit. In this case, the force fit is in each case provided partly by the holding disk and partly by the force-fitting ring.

The holding disk can act as a stop disk. Such a holding disk therefore has a further function in addition to realizing the force fit. In other words, a single part constituting both a stop disk and a holding disk is provided. This results overall in a compact design of the rotation-limiting assembly.

The internally threaded sleeve can be coupled to the housing via a rotation-limiting mechanism such that, even when the breakaway torque is exceeded, the internally threaded sleeve is rotatable only to a limited extent in relation to the housing. In another example, the first sliding guide sleeve can be coupled to the shaft portion via a rotation-limiting mechanism such that, even when the breakaway torque is exceeded, the first sliding guide sleeve is rotatable only to a limited extent in relation to the shaft portion. In this way, an undesirably large relative rotation between the shaft portion and the housing may be avoided. During the operation of such a rotation-limiting assembly, a user therefore feels an increased resistance while rotating the steering wheel, the resistance implying that the breakaway torque of the force fit and a resultantly released rotatability is exceeded. The user therefore feels that a maximum angle of rotation will be imminently reached. After a certain further relative rotation, the rotation-limiting mechanism limits any further relative rotation. This is then no longer surprising for the user.

It is possible here for the rotation-limiting mechanism to comprise a pin that engages in a groove extending in the circumferential direction or in an elongated hole extending in the circumferential direction. A direction of extent of the groove or of the elongated hole is understood in each case as meaning the associated longitudinal direction, Such a rotation-limiting mechanism is constructed structurally simply and is reliable in operation.

According to one example, at least one of the stop disks is formed integrally with the shaft portion. In particular, such a stop disk is designed as a shaft shoulder. This results in a simple design of the rotation-limiting assembly.

When viewed in the radial direction, a first axial distance between the first stop disk and the component carrying the sliding guide internal contour and a second axial distance between the second stop disk and the component carrying the sliding guide internal contour can be cumulatively greater than or equal to two times a pitch of the internal thread. The first axial distance and the second axial distance can be cumulatively greater than or equal to three times a pitch of the internal thread. As discussed herein, a rotational movement of the shaft portion is converted by the threaded pair into an axial movement of the component carrying the sliding guide internal contour. It is therefore possible to set a maximally permitted angle of rotation of the shaft portion in a first direction of rotation via the first axial distance and a maximally permitted angle of rotation of the shaft portion in a second direction of rotation, which is opposed to the first direction of rotation, via the second axial distance. A rotational movement of the shaft portion can be converted here via the thread pitch into an axial movement of the component carrying the sliding guide internal contour. It goes without saying that a pitch of the internal thread and of the external thread meshing therewith can be the same. A pitch of a thread is understood here as meaning the axial distance that is covered by one revolution. This is synonymous with an axial distance between two thread tips. The pitch of a thread is sometimes also referred to as a lead. In the event that the cumulative axial distance is two times a pitch of the internal thread, the thread portion can be rotated from a rotational position, which corresponds to a center position, by 360° in both directions before the component carrying the sliding guide internal contour makes contact with the corresponding stop disk. In the event that the cumulative distance is three times a pitch of the internal thread, the shaft portion can be rotated from the center position by 540° in each direction.

The steering wheel assembly provides high operating comfort since a user is not surprised by a limitation of a rotation of the steering wheel and of the steering wheel shaft coupled thereto.

Furthermore, the effects and advantages explained in respect of the rotation-limiting assembly according to the disclosure also apply to the steering wheel assembly according to the disclosure.

BRIEF DESCRIPTION OF DRAWINGS

The disclosure is explained below with reference to various exemplary arrangements, which are shown in the attached drawings, in which.

DETAILED DESCRIPTION

The disclosure is directed toward a steering wheel assembly for a steer-by-wire steering system, which comprises a steering wheel fastened to a first end of a steering wheel shaft, and a rotation-limiting assembly, wherein the rotation-limiting assembly is provided at a second end of the steering wheel shaft, which end faces away from the steering wheel.

Sometimes, the components of steering wheel assemblies are also referred to as a handwheel actuator or as a torque feedback unit. However, these terms may not include the steering wheel. In some instances, steering wheel assemblies are designed, inter alia, to generate a torque that provides the driver with mechanical feedback in the form of a restoring moment.

Rotation-limiting assemblies are sometimes also referred to as a mechanical torque limiter, with the aim here being for the introduction of a torque into the steering wheel assembly by operation of the steering wheel to be limited. Accordingly, rotation-limiting assemblies are used in steer-by-wire steering systems in order to limit a rotation of the steering wheel in both directions of rotation. Thus, the wiring for electrical systems that are arranged in the steering wheel are not damaged. Customarily, rotation-limiting assemblies are configured in such a manner that they permit rotation of the steering wheel by, for example, 540°, i.e. 1.5 revolutions, in both directions. In addition, for safety reasons, rotation-limiting assemblies have to be designed in such a manner that they function even if a power supply fails.

Figure 1:
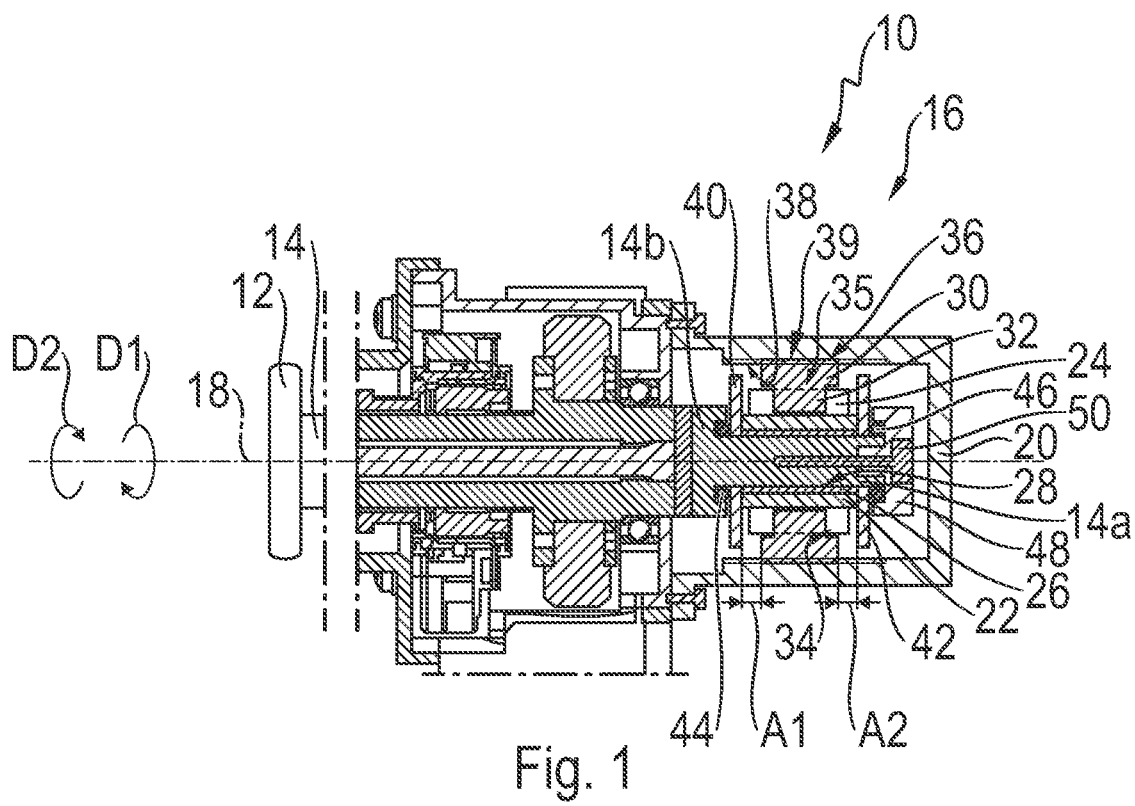
FIG. 1 shows a steering wheel assembly according to the disclosure with a rotation-limiting assembly according to the disclosure according to a first exemplary arrangement in a center position.

FIG. 1 shows a steering wheel assembly 10 for a steer-by-wire steering system.

The steering wheel assembly 10 comprises a steering wheel 12, illustrated schematically, that is fastened to a first end of a steering wheel shaft 14, and a rotation-limiting assembly 16 according to a first exemplary arrangement, which is provided at a second end of the steering wheel shaft 14, which end faces away from the steering wheel 12.

The steering wheel 12 is rotatable together with the steering wheel shaft 14 about a center axis 18.

The rotation-limiting assembly 16 can limit a rotation of the steering wheel 12 and of the steering wheel shaft 14, which is connected thereto, in both directions.

The rotation-limiting assembly 16 has a housing 20 in which a shaft portion 14a of the steering wheel shaft 14 is accommodated.

Furthermore, a first sliding guide sleeve 22 is provided.

The latter, on its external circumference, carries a sliding guide external contour 24.

On its internal circumference, the first sliding guide sleeve 22 is fastened on the shaft portion 14a by a force-fitting ring 26, which is designed as a tolerance ring, via a force fit 28, in more precise terms via a first force-fitting portion.

The force-fitting ring 26 is arranged radially between the first sliding guide sleeve 22 and the shaft portion 14a.

The rotation-limiting assembly 16 also comprises a second sliding guide sleeve 30.

The second sliding guide sleeve 30 has, on its internal circumference, a sliding guide internal contour 32 that engages in the sliding guide external contour 24.

The sliding guide internal contour 32 and the sliding guide external contour 24 therefore form a sliding guide 34.

Generally, the second sliding guide sleeve 30 is a component 35 carrying the sliding guide internal contour 32.

On its external circumference, the second sliding guide sleeve 30 has an external thread 36. The latter cooperates with an internal thread 38 that is provided on the housing 20.

The external thread 36 and the internal thread 38 therefore form a threaded pair 39.

In the example arrangement illustrated, the sliding guide internal contour 32 and the sliding guide external contour 24 are designed as axial toothings.

The second sliding guide sleeve 30 is therefore held non-rotatably on the first sliding guide sleeve 22, but so as to be displaceable axially in relation thereto.

Owing to the threaded pair 39, the second sliding guide sleeve 30 can be rotated in relation to the housing 20.

The shaft portion 14a is therefore coupled to the housing 20 via the threaded pair 39, the sliding guide 34 and the force fit 28. The threaded pair 39, the sliding guide 34 and the force fit 28 are arranged sequentially in the radial direction here.

The force fit 28 is designed in such a manner that, when a predefined breakaway torque is exceeded, the shaft portion 14a can be rotated in relation to the housing 20. In other words, the force-fitting ring 26 can slip through as soon as the shaft portion 14a is loaded with a torque, which exceeds the breakaway torque, relative to the housing 20.

For example, when the predefined breakaway torque is exceeded, the first sliding guide sleeve 22 is therefore rotatable in relation to the shaft portion 14a.

Furthermore, a first stop disk 40 is provided on a first axial side of the sliding guide external contour 24, i.e. on a first axial side of the first sliding guide sleeve 22.

The first stop disk 40 is substantially in the shape of a circular disk, with the shaft portion 14a extending through a central opening in the first stop disk 40.

A second stop disk 42 is provided on a second axial side of the sliding guide external contour 24, which side is opposed to the first axial side.

The second stop disk 42 is therefore positioned on a side of the first sliding guide sleeve 22, which side is opposed to the first stop disk 40.

The second stop disk 42 is also substantially in the shape of a circular disk, with the shaft portion 14a again extending through a central opening in the second stop disk 42.

On an axial side facing away from the first sliding guide sleeve 22, the first stop disk 40 is placed against a shaft shoulder 14b via an O ring 44.

In other words, the first stop disk 40 is clamped in the axial direction between the O ring 44 and the first sliding guide sleeve 22.

In a corresponding manner, the second stop disk 42 lies via an O ring 46 on a thrust piece 48 that is fastened to an axial end of the shaft portion 14a by a screw 50.

The second stop disk 42 is therefore clamped between the first sliding guide sleeve 22 and the O ring 46.

When the stop disks 40, 42 are clamped and the O rings 44, 46 are compressed, the stop disks 40, 42 lie under prestress in the axial direction on the first sliding guide sleeve 22.

The force fit 28 is therefore proportionally also brought about by contact of the stop disks 40, 42 against the first sliding guide sleeve 22.

The stop disks 40, 42 therefore also act as holding disks 52, 54.

Furthermore, the first stop disk 40 is designed to make contact with the second sliding guide sleeve 30 in order to limit a rotational movement of the shaft portion 14a in a first direction of rotation D1.

The second stop disk 42 is designed to make contact with the second sliding guide sleeve 30 in order to limit a rotational movement of the shaft portion 14a in a second direction of rotation D2.

In this connection, the rotation-limiting assembly 16 is configured in such a manner that, when viewed in the radial direction, a first axial distance A1 between the first stop disk 40 and the second sliding guide sleeve 30 and a second axial distance A2 between the second stop disk 42 and the second sliding guide sleeve 30 cumulatively correspond to two times a pitch of the internal thread 38.

FIG. 1 illustrates the second sliding guide sleeve 30 of the rotation-limiting assembly 16 in a center position, and therefore the axial distances A1 and A2 can be identical in size.

Figure 2:
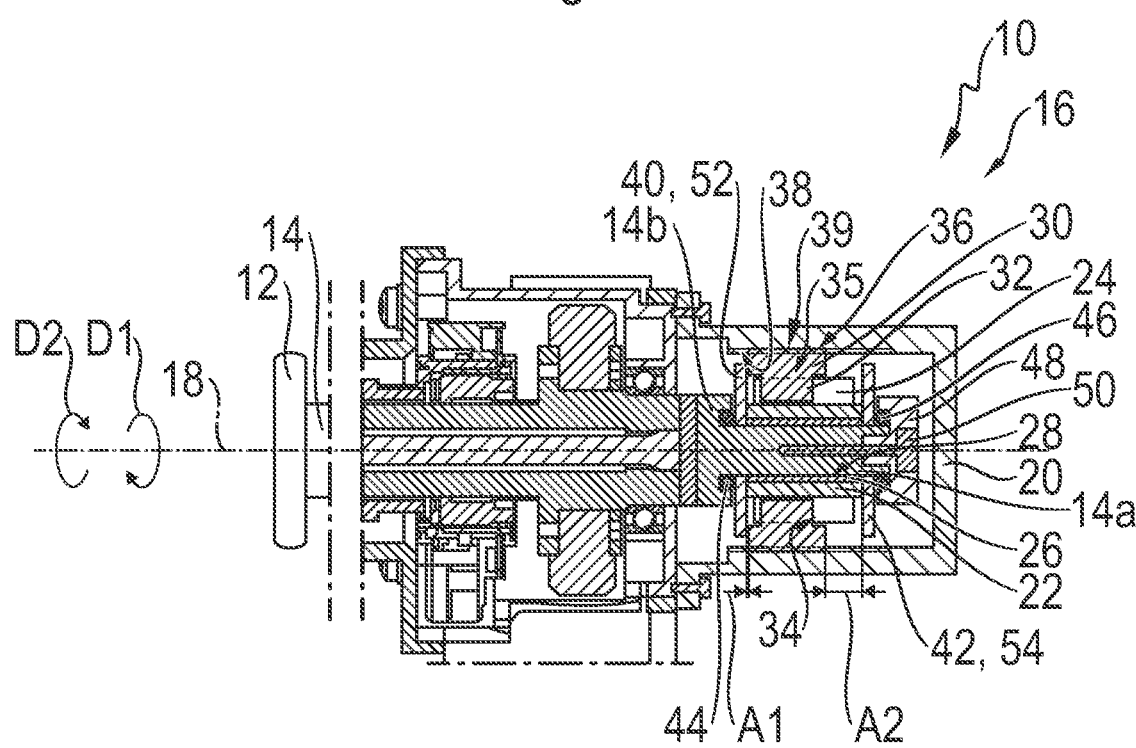
FIG. 2 shows the steering wheel assembly from FIG. 1, the rotation-limiting assembly assuming a first stop position.
Figure 3:
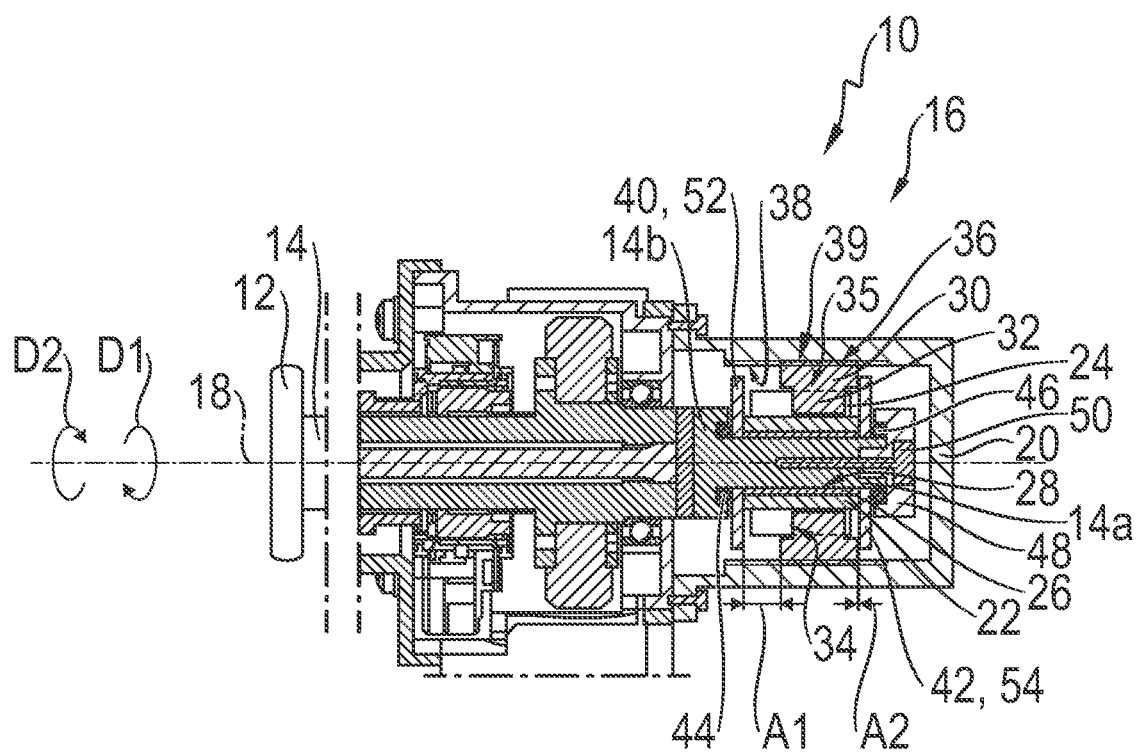
FIG. 3 shows the steering wheel assembly from FIGS. 1 and 2, the rotation-limiting assembly assuming a second stop position.

If, proceeding therefrom, the steering wheel shaft 14 is rotated in the first direction of rotation D1, the second sliding guide sleeve 30 makes contact with the first stop disk 40 after a revolution of 360° (see FIG. 2).

Proceeding from this situation, the shaft portion 14a can then only be rotated further relative to the housing 20 if the breakaway torque is exceeded. In this situation, a user of the steering wheel assembly 10 therefore can feel a significantly increased resistance during rotation of the steering wheel 12 coupled to the steering wheel shaft 14.

The same applies if the steering wheel 12 and the steering wheel shaft 14, which is coupled thereto, is rotated from the center position in the second direction of rotation D2.

Base on the effect of the threaded pair 39, the second sliding guide sleeve 30 shifts in the axial direction and, after a revolution of 360°, strikes against the second stop disk 42. Further rotation is then still possible, but the breakaway torque needs to be overcome. A user of the steering wheel assembly 10 therefore notices an increased rotational resistance.

It is understood the axial distances A1, A2 can be selected depending on the application. For example, the axial distances A1, A2 can also be selected in such a manner that they cumulatively amount to three times the pitch of the internal thread. The shaft portion 14a can then be rotated from the center position shown in FIG. 1 by 1.5 revolutions in each direction before the second sliding guide sleeve 30 runs against a respectively associated stop disk 40, 42.

In another exemplary arrangement, not illustrated specifically here, one thread direction of rotation of the threaded pair 39 can be designed in such a manner that, when the steering wheel 12 and the steering wheel shaft 14 that is coupled thereto are rotated from the center position in the first direction of rotation D1, the second sliding guide sleeve 30 shifts until it strikes against the second stop disk 42, In this exemplary arrangement, when the steering wheel 12 and the steering wheel shaft 14 coupled thereto rotate from the center position in the second direction of rotation D2, the second sliding guide sleeve 30 would therefore ultimately strike against the first stop disk 40. Whether the second sliding guide sleeve 30 therefore strikes against the first stop disk 40 or the second stop disk 42, depending on the direction of rotation D1 or D2, therefore also depends on the thread direction of rotation of the threaded pair 39.

Figure 4:
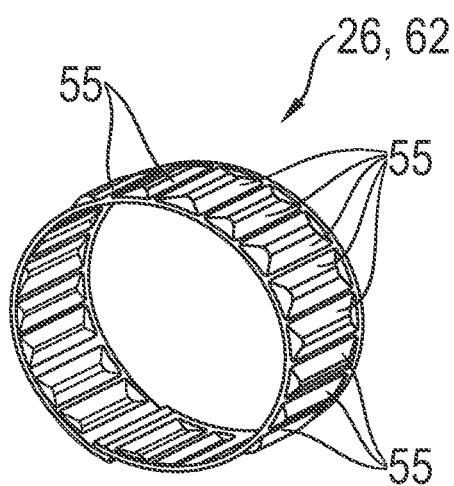
FIG. 4 shows a force-fitting ring, which is designed as a tolerance ring of the rotation-limiting assembly from FIGS. 1 to 3 in an isolated illustration.

FIG. 4 shows the force-fitting ring 26, which is in the form of a tolerance ring, in an isolated illustration.

It can be seen here that the force-fitting ring 26 is in the form of a punched and bent part made from sheet metal. On its external circumference, it has a multiplicity of convexities 55 that are compressed in a defined manner when the force-fitting ring 26 is arranged between the shaft portion 14a and the first sliding guide sleeve 22.

Figure 5:
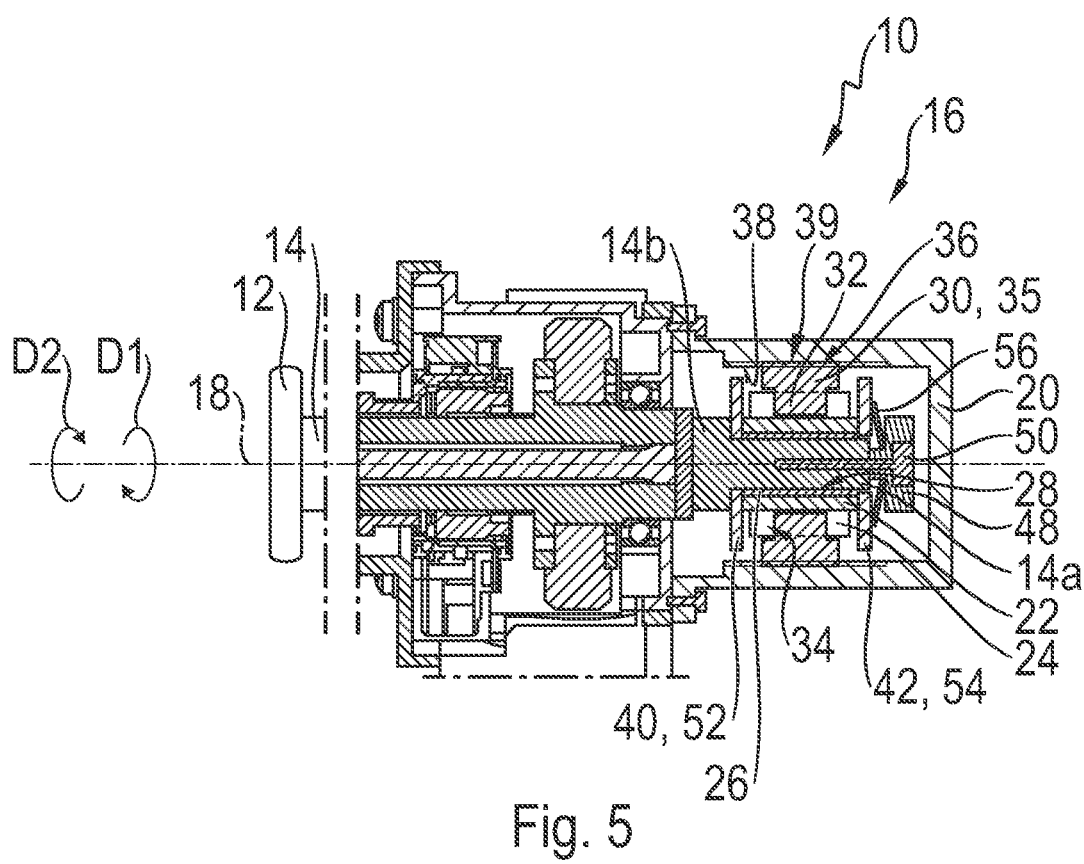
FIG. 5 shows a steering wheel assembly according to the disclosure with a rotation-limiting assembly according to the disclosure according to a second exemplary arrangement.

A steering wheel assembly 10 with a rotation-limiting assembly 16 according to a second exemplary arrangement is illustrated in FIG. 5.

Only the difference in relation to the rotation-limiting assembly 16 according to the first exemplary arrangement is discussed here. Identical or mutually corresponding components are provided with the same reference signs.

In the present case, the differences concern the mounting and prestress of the stop disks 40, 42, that are again also holding disks 52, 54.

In comparison to the first exemplary arrangement, the O rings 44, 46 have been omitted. The first stop disk 40 therefore lies on one side directly on the shaft shoulder 14b and on the other side directly on the first sliding guide sleeve 22.

The second stop disk 42 also lies directly on the first sliding guide sleeve 22. However, on the axial side of the second stop disk, which side faces away from the first sliding guide sleeve 22, a disk spring 56 is provided via which the second stop disk 42 is prestressed in the axial direction by the thrust piece 48.

In respect of its function and the remaining structure, the rotation-limiting assembly 16 according to the second exemplary arrangement corresponds to the first exemplary arrangement, and therefore reference can be made to the explanations above.

Figure 6:
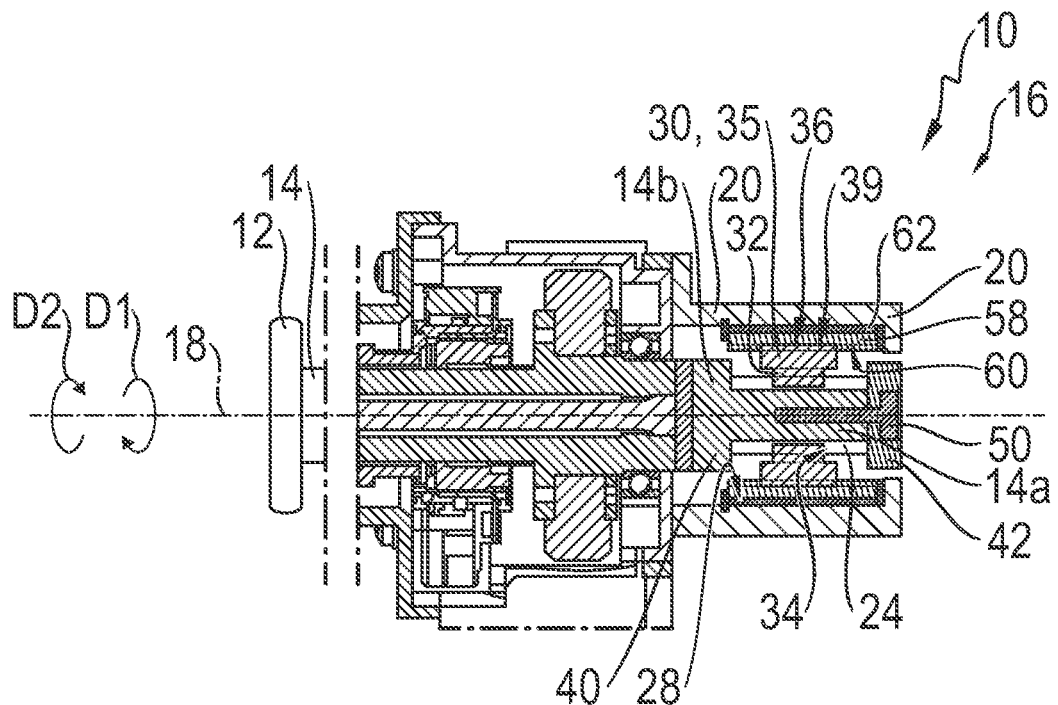
FIG. 6 shows a steering wheel assembly according to the disclosure with a rotation-limiting assembly according to the disclosure according to a third exemplary arrangement.

A steering wheel assembly 10 having a rotation-limiting assembly 16 according to a third exemplary arrangement is shown in FIG. 6.

Again, only the differences with regard to the exemplary arrangements that have already been explained will be discussed here. Identical or mutually corresponding components are provided with the same reference signs.

In contrast to the previously explained exemplary arrangements, the sliding guide external contour 24 is now provided directly on the shaft portion 14a. The first sliding guide sleeve 22 is therefore dispensed with.

A further difference can comprise that an internally threaded sleeve 58 is now provided, the internal circumference of which is provided with an internal thread 60 that engages with an external thread 36 of the second sliding guide sleeve 30.

The threaded pair 39 is therefore provided between the internally threaded sleeve 58 and the second sliding guide sleeve 30. The internally threaded sleeve 58 is mounted here in the housing 20 via a force-fitting ring 62, which is in the form of a tolerance ring.

The force-fitting ring 62 is now designed in such a manner that it brings about a force-fitting connection between the internally threaded sleeve 58 and the housing 20, the connection being designed in such a manner that the internally threaded sleeve 58 can be rotated in relation to the housing 20 if a predetermined breakaway torque is exceeded.

The force-fitting ring 62 is illustrated in isolation in FIG. 4.

The force-fitting ring 62 is arranged radially between the internally threaded sleeve 58 and the housing 20.

There are also differences in respect of the stop disks 40, 42.

The first stop disk 40 is now formed integrally with the shaft portion 14*a*. In other words, the first stop disk 40 is formed by the shaft shoulder 14*b*.

The second stop disk 42 is fastened to the axial end of the shaft portion 14*a* by the screw 50. The second stop disk 42 can also be considered to be a development of the thrust piece 48.

The two stop disks 40, 42 are mounted rigidly in relation to the shaft portion 14*a*.

The stop disks 40, 42 are now also no longer designed as holding disks.

The function of the rotation-limiting assembly according to FIG. 6 is as in the previously explained exemplary arrangements. One difference is that, after the second sliding guide sleeve 30 has made contact with the first stop disk 40 or the second stop disk 42, a relative rotation occurs between the internally threaded sleeve 58 and the housing 20. This relative rotation replaces a relative rotation between the shaft portion 14*a* and the first sliding guide sleeve 22.

Figure 7:
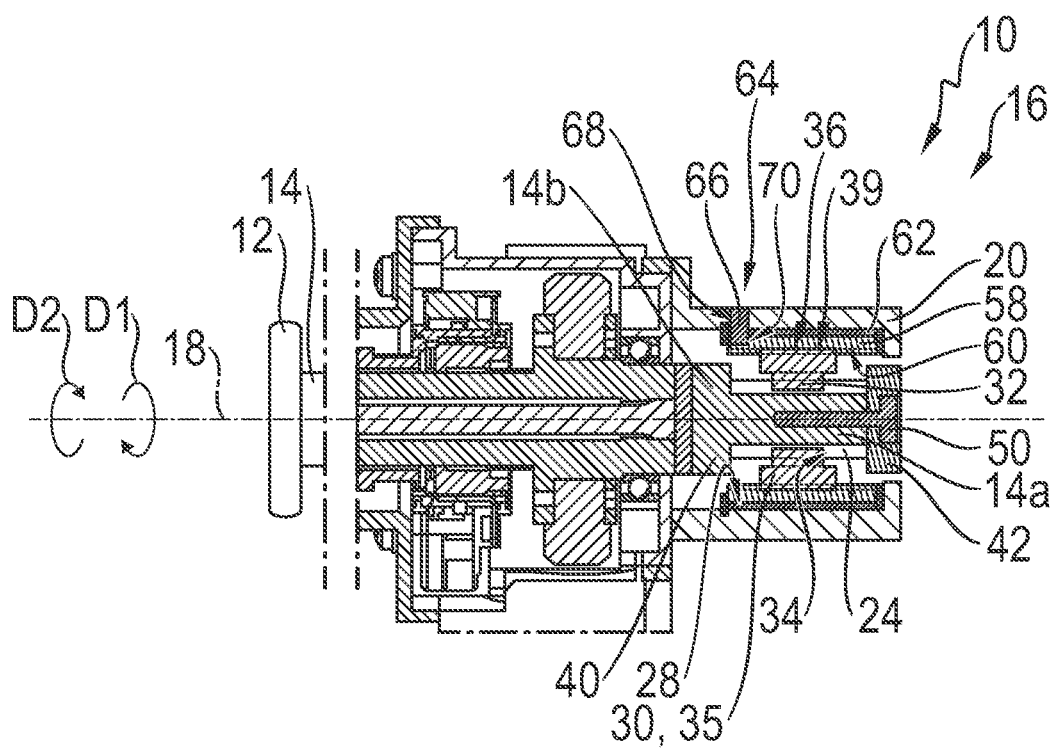
FIG. 7 shows a steering wheel assembly according to the disclosure with a rotation-limiting assembly according to the disclosure according to a fourth exemplary arrangement.

A variant of the steering wheel assembly 10 having a rotation-limiting assembly according to the third exemplary arrangement is shown in FIG. 7. This variant is referred to as a fourth exemplary arrangement.

The difference in relation to the third exemplary arrangement can comprise that a rotation-limiting mechanism 64 is now provided.

In this case, the internally threaded sleeve 58 is coupled to the housing 20 via said rotation-limiting mechanism 64, and therefore, even when the breakaway torque is exceeded, the internally threaded sleeve 58 is rotatable only to a limited extent in relation to the housing 20.

The rotation-limiting mechanism 64 comprises a pin 66 that is mounted in an associated opening 68 on the housing 20. The pin 66 is held immovably here on the housing 20.

The pin 66 protrudes radially inward from the housing 20 and engages in an elongated hole 70 that is formed on the internally threaded sleeve 58 and extends in the circumferential direction.

The internally threaded sleeve 58 can therefore be rotated in relation to the housing 20 only to the extent that the pin 66 is displaceable relative to the elongated hole. As soon as the pin 66 strikes against an end of the elongated hole 70, no further rotation is possible.

Furthermore, the explanations with regard to the third exemplary arrangement also apply to the fourth exemplary arrangement.

It is understood that the rotation-limiting mechanism 64 which is explained in connection with the fourth exemplary arrangement can readily also be used in the other exemplary arrangements.

For example, a variant of the first exemplary arrangement can be equipped with such a rotation-limiting mechanism 64 (not illustrated). In this case, the pin 66 is positioned in an associated opening 68 on the shaft portion 14*a* and interacts with an elongated hole 70 that is provided on the first sliding guide sleeve 22.

Figure 8:
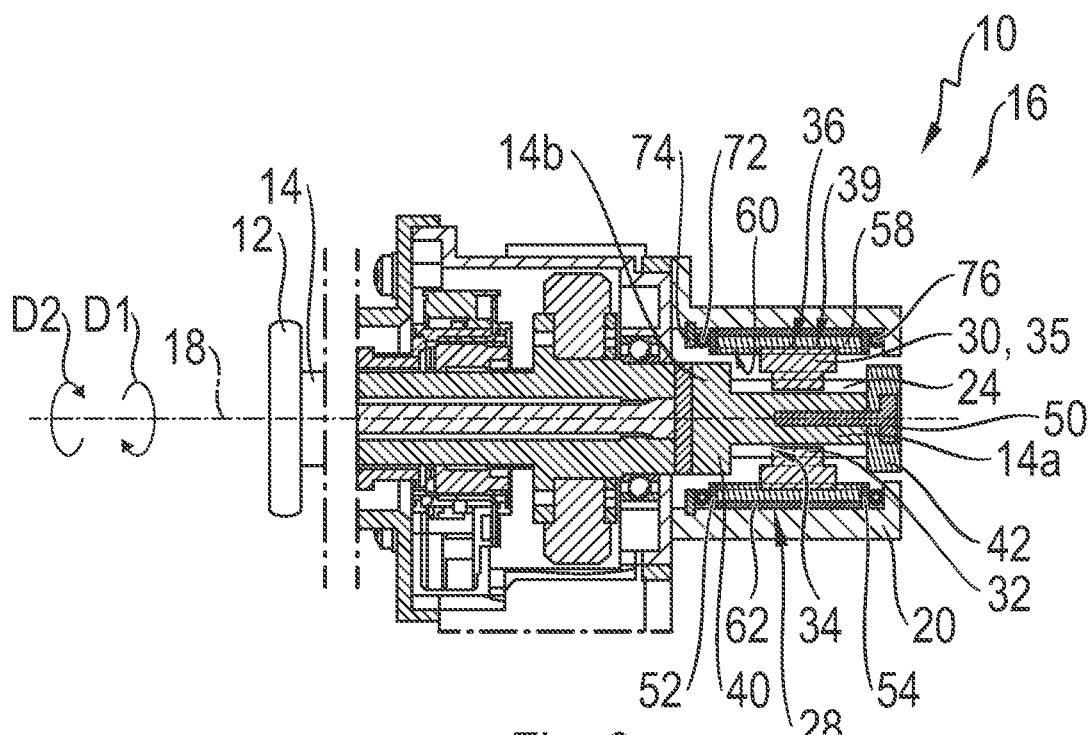
FIG. 8 shows a steering wheel assembly according to the disclosure with a rotation-limiting assembly according to the disclosure according to a fifth exemplary arrangement in a center position.
Figure 9:
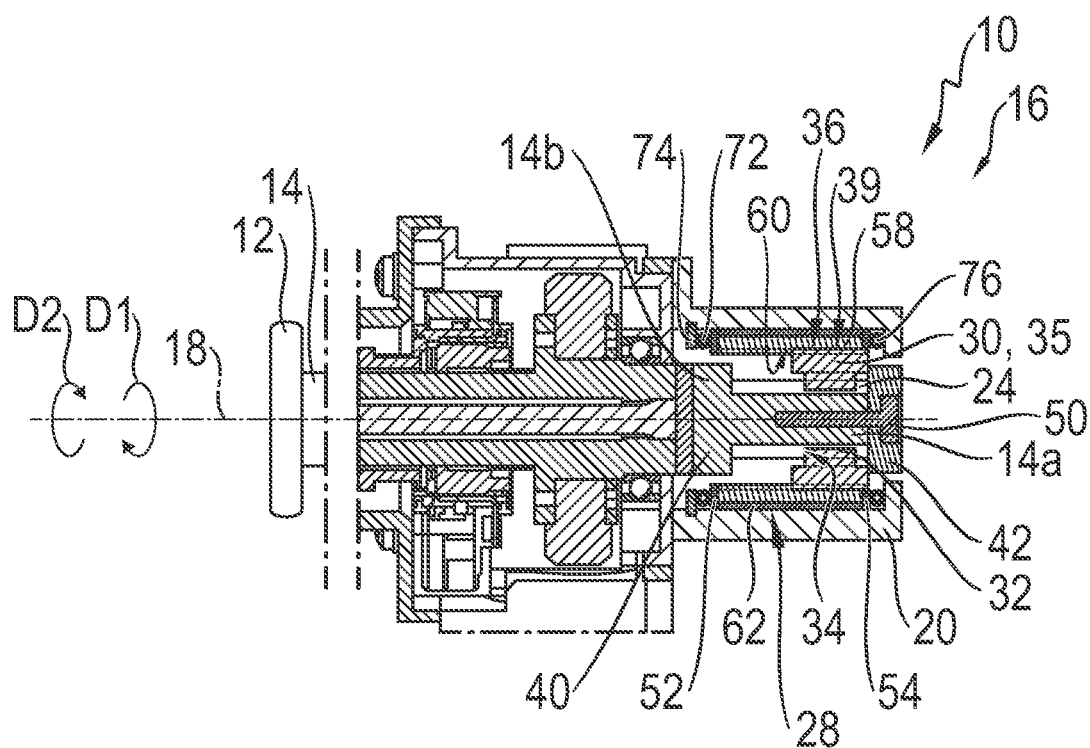
FIG. 9 shows the steering wheel assembly from FIG. 8, the rotation-limiting assembly assuming a stop position.
Figure 10:
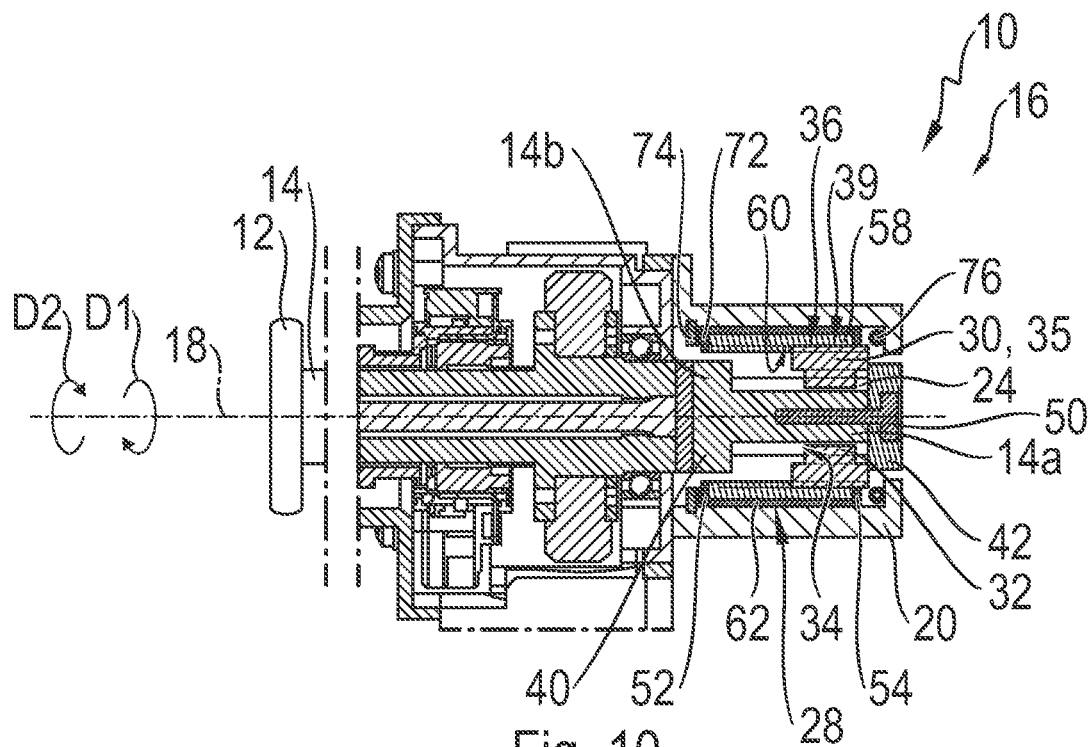
FIG. 10 shows the steering wheel assembly from FIGS. 8 and 9, the rotation-limiting assembly being moved beyond the stop position.

FIGS. 8 to 10 illustrate a steering wheel assembly 10 having a rotation-limiting assembly 16 according to a fifth exemplary arrangement.

The fifth exemplary arrangement is a development of the third exemplary arrangement. As such, only the differences in relation to the third exemplary arrangement will be explained below.

As already mentioned, the stop disks 40, 42 are not holding disks in the fifth exemplary arrangement either.

However, holding disks 52, 54, which are separated from the stop disks 40, 42, are now provided.

The first holding disk 52 is placed here onto the internally threaded sleeve 58 under axial prestress that results from an axial compression of a spring element 72.

The spring element 72 is held axially on the housing 20 by a securing ring 74.

The second holding disk 54 is likewise placed onto the internally threaded sleeve 58 under axial prestress. The axial prestress results here from the compression of a spring element 76. The latter is arranged between the second holding disk 54 and the housing 20.

Both the spring element 72 and the spring element 76 are designed as elastomer springs. It is likewise conceivable to produce at least one of the spring elements 72, 76 from metal, for example in the form of a disk spring made from steel.

If the rotation-limiting assembly 16 according to the fifth exemplary arrangement is operated in such a manner that the second sliding guide sleeve 30 runs against the second stop disk 42 (see FIG. 9), the internally threaded sleeve 58 can be moved in a direction away from the second stop disk 42. The spring element 72 is compressed in the process.

If the spring element 72 cannot be compressed further, but, via the shaft portion 14*a*, a torque is introduced that is greater than the breakaway torque of the force-fitting ring 62, the internally threaded sleeve 58 can be rotated in relation to the housing 20 (see FIG. 10).

The same applies (not illustrated) for a situation in which the second sliding guide sleeve 30 runs against the first stop disk 40.

It is understood that the rotation-limiting assembly 16 according to the fifth exemplary arrangement can also be combined with a rotation-limiting mechanism 64 as has been described in conjunction with the rotation-limiting assembly 16 according to the fourth exemplary arrangement. However, care has to be taken to ensure that the elongated hole 70 is of such a width in the axial direction that it does not obstruct the previously descried axial shifting of the internally threaded sleeve 58.

Figure 11:
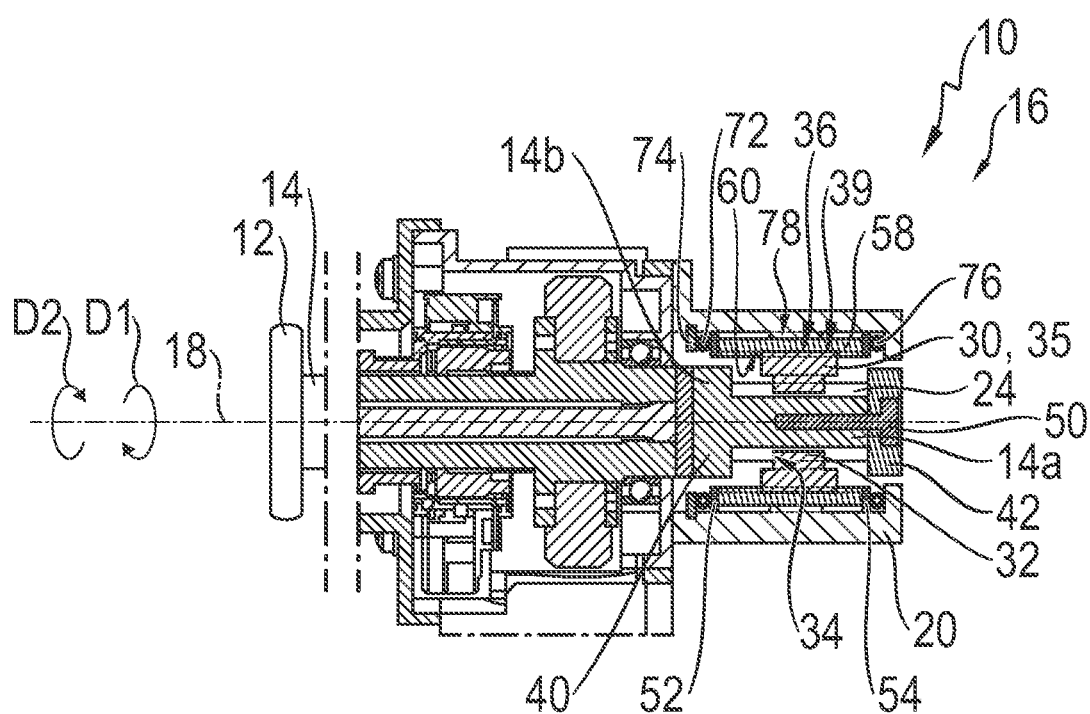
FIG. 11 shows a steering wheel assembly according to the disclosure with a rotation-limiting assembly according to the disclosure according to a sixth exemplary arrangement.

FIG. 11 shows a steering wheel assembly 10 having a rotation-limiting assembly 16 according to a sixth exemplary arrangement.

This exemplary arrangement is a development of the fifth exemplary arrangement from FIGS. 8 to 10, and therefore it is explained on this basis.

In comparison to the fifth exemplary arrangement, the force-fitting ring 62 is omitted.

The internally threaded sleeve 58 is now mounted on the housing 20 in an axially displaceable manner via a further sliding guide 78, but non-rotatably.

If the second sliding guide sleeve 30 strikes against one of the stop disks 40, 42, the shaft portion 14*b* can therefore now rotate further because the internally threaded sleeve 58 can be shifted axially under axial compression of the respectively associated spring element 72, 76.

The holding disks 52, 54 accordingly serve merely for compressing the spring elements 72, 76.

The rotation-limiting assembly 16 according to the sixth exemplary arrangement therefore manages without a force fit.

The invention claimed is:

1. A rotation-limiting assembly for a steer-by-wire steering system, comprising:
   a housing, in which a shaft portion that is rotatable about a center axis and wherein the shaft portion is rotationally coupled to a steering wheel shaft-or is configured as a portion of the steering wheel shaft,
   wherein the shaft portion is coupled to the housing via a threaded pair, which comprises an external thread and an internal thread screwed into the external thread, a sliding guide with a sliding guide external contour and a sliding guide internal contour, and a force fit or a further sliding guide,
   wherein the threaded pair, the sliding guide, and the force fit or the further sliding guide are arranged sequentially in the radial direction,
   wherein the force fit couples the shaft portion to the housing in such a manner that, when a predefined breakaway torque is exceeded, the shaft portion is rotatable in relation to the housing, and
   wherein a first stop disk is provided on the shaft portion on a first axial side of the sliding guide external contour and a second stop disk is provided on the shaft portion on a second axial side which is opposed to the first axial side, and the first stop disk and the second stop disk are designed to make contact with a component carrying the sliding guide internal contour to limit a rotational movement of the shaft portion.

2. The rotation-limiting assembly as claimed in claim 1, wherein the sliding guide external contour is provided on the external circumference of a first sliding guide sleeve that is coupled to the shaft portion via the force fit such that, when a predefined breakaway torque is exceeded, the first sliding guide sleeve is rotatable in relation to the shaft portion.

3. The rotation-limiting assembly as claimed in claim 1, wherein an internally threaded sleeve is provided that, on its internal circumference, has an internal thread that cooperates with an external thread provided on the component carrying the sliding guide internal contour,
   wherein the internally threaded sleeve is fastened to the housing via the force fit such that, when a predefined breakaway torque is exceeded, the internally threaded sleeve is rotatable in relation to the housing, or wherein the internally threaded sleeve is coupled non-rotatably but axially displaceably to the housing via the further sliding guide.

4. The rotation-limiting assembly as claimed in claim 2, wherein the first sliding guide sleeve is fastened to the shaft portion via a force-fitting ring arranged radially between the first sliding guide sleeve and the shaft portion, or the internally threaded sleeve is fastened to the housing via a force-fitting ring arranged radially between the internally threaded sleeve and the housing.

5. The rotation-limiting assembly as claimed in claim 4, wherein the force-fitting ring is formed as a punched and bent part.

6. The rotation-limiting assembly as claimed in claim 2, wherein at least one holding disk that is spring-loaded in the axial direction lies under prestress in the axial direction on the first sliding guide sleeve such that the first sliding guide sleeve is fastened to the shaft portion the holding disk via the force fit, or
   the at least one holding disk that is spring-loaded in the axial direction lies under prestress in the axial direction on the internally threaded sleeve such that the internally threaded sleeve is fastened to the housing the holding disk via the force fit.

7. The rotation-limiting assembly as claimed in claim 6, wherein the holding disk acts as a stop disk.

8. The rotation-limiting assembly as claimed in claim 2, wherein the internally threaded sleeve is coupled to the housing via a rotation-limiting mechanism such that, even when the breakaway torque is exceeded, the internally threaded sleeve is rotatable only to a limited extent in relation to the housing, or
   the first sliding guide sleeve is coupled to the shaft portion via a rotation-limiting mechanism such that, even when the breakaway torque is exceeded, the first sliding guide sleeve is rotatable only to a limited extent in relation to the shaft portion.

9. The rotation-limiting assembly as claimed in claim 8, wherein the rotation-limiting mechanism comprises a pin that engages in a groove extending in the circumferential direction or in an elongated hole extending in the circumferential direction.

10. The rotation-limiting assembly as claimed in claim 1, wherein at least one of the stop disks is formed integrally with the shaft portion.

11. The rotation-limiting assembly as claimed in claim 1, wherein, when viewed in the radial direction, a first axial distance between the first stop disk and the component carrying the sliding guide internal contour and a second axial distance between the second stop disk and the component carrying the sliding guide internal contour are cumulatively greater than or equal to two times a pitch of the internal thread.

12. A steering wheel assembly for a steer-by-wire steering system, having a steering wheel, that is fastened to a first end of a steering wheel shaft, and a housing, in which a shaft portion that is rotatable about a center axis, wherein the shaft portion is rotationally coupled to a steering wheel shaft or is configured as a portion of the steering wheel shaft,
   wherein the shaft portion is coupled to the housing via a threaded pair, which comprises an external thread and an internal thread screwed into the external thread, a sliding guide with a sliding guide external contour and a sliding guide internal contour, and a force fit or a further sliding guide,
   wherein the threaded pair, the sliding guide, and the force fit or the further sliding guide are arranged sequentially in the radial direction, wherein the force fit couples the shaft portion to the housing in such a manner that, when a predefined breakaway torque is exceeded, the shaft portion is rotatable in relation to the housing, and
   wherein a first stop disk is provided on the shaft portion on a first axial side of the sliding guide external contour and a second stop disk is provided on the shaft portion on a second axial side that is opposed to the first axial side, and the first stop disk and the second stop disk are designed to make contact with a component carrying the sliding guide internal contour to limit a rotational movement of the shaft portion.

13. A rotation-limiting assembly for a steer-by-wire steering system comprising:
- a housing, in which a shaft portion that is rotatable about a center axis is coupled to a steering wheel shaft,
- wherein the shaft portion is coupled to the housing via a threaded pair, a sliding guide with a sliding guide external contour and a sliding guide internal contour, and a force fit, and
- wherein the threaded pair, the sliding guide, and the force fit are arranged sequentially in the radial direction, wherein the force fit couples the shaft portion to the housing in such a manner that, when a predefined breakaway torque is exceeded, the shaft portion is rotatable in relation to the housing.

14. The rotation-limiting assembly as claimed in claim 13, wherein a first stop disk is provided on the shaft portion on a first axial side of the sliding guide external contour and a second stop disk is provided on the shaft portion on a second axial side that is opposed to the first axial side, and the first stop disk and the second stop disk are configured to make contact with a component carrying the sliding guide internal contour to limit a rotational movement of the shaft portion.

15. The rotation-limiting assembly as claimed in claim 14, wherein the sliding guide external contour is provided on the external circumference of a first sliding guide sleeve that is coupled to the shaft portion via the force fit such that, when a predefined breakaway torque is exceeded, the first sliding guide sleeve is rotatable in relation to the shaft portion.

16. The rotation-limiting assembly as claimed in claim 15, wherein an internally threaded sleeve is provided that, on its internal circumference, has an internal thread that cooperates with an external thread provided on the component carrying the sliding guide internal contour,
- wherein the internally threaded sleeve is fastened to the housing via the force fit such that, when a predefined breakaway torque is exceeded, the internally threaded sleeve is rotatable in relation to the housing, or wherein the internally threaded sleeve is coupled non-rotatably but axially displaceably to the housing via the further sliding guide.

17. The rotation-limiting assembly as claimed in claim 16, wherein the first sliding guide sleeve is fastened to the shaft portion via a force-fitting ring arranged radially between the first sliding guide sleeve and the shaft portion.

18. The rotation-limiting assembly as claimed in claim 17, wherein the force-fitting ring is formed as a punched and bent part.

19. The rotation-limiting assembly as claimed in claim 16, wherein the internally threaded sleeve is fastened to the housing via a force-fitting ring arranged radially between the internally threaded sleeve and the housing.

20. The rotation-limiting assembly as claimed in claim 19, wherein the force-fitting ring is formed as a punched and bent part.

\* \* \* \* \*